United States Patent
Ang et al.

(10) Patent No.: US 11,160,071 B2
(45) Date of Patent: Oct. 26, 2021

(54) CARRIER AGGREGATION WITH SELF-CONTAINED SUBFRAME FOR EFFICIENT MODEM PROCESSING

(71) Applicant: QUALCOMM Incorporated, San Diego, CA (US)

(72) Inventors: Peter Pui Lok Ang, San Diego, CA (US); Joseph Binamira Soriaga, San Diego, CA (US); Tingfang Ji, San Diego, CA (US); Jing Jiang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 94 days.

(21) Appl. No.: 15/785,128

(22) Filed: Oct. 16, 2017

(65) Prior Publication Data

US 2018/0110048 A1   Apr. 19, 2018

Related U.S. Application Data

(60) Provisional application No. 62/409,594, filed on Oct. 18, 2016.

(51) Int. Cl.
*H04W 72/04* (2009.01)
*H04L 5/00* (2006.01)
(Continued)

(52) U.S. Cl.
CPC ....... *H04W 72/0446* (2013.01); *H04L 1/0071* (2013.01); *H04L 1/1854* (2013.01);
(Continued)

(58) Field of Classification Search
CPC ................. H04W 72/0446; H04W 72/0453; H04L 1/12; H04L 5/00; H04L 5/001;
(Continued)

(56) References Cited

U.S. PATENT DOCUMENTS 9,204,411 B2   12/2015   Chen et al.
10,153,867 B2  12/2018   Chen et al.
(Continued)

FOREIGN PATENT DOCUMENTS

CN    10287036 A     1/2013
WO    2012064935 A1  5/2012
(Continued)

OTHER PUBLICATIONS

Qualcomm Incorporated, Self-contained subframe timeline analysis, Aug. 22-26, 2016, 7 pages, 3GPP TSG-RAN WG1 #86 R1-1610181 (Year: 2016).*
(Continued)

*Primary Examiner* — Farid Seyedvosoghi
(74) *Attorney, Agent, or Firm* — Arent Fox LLP

(57) ABSTRACT

The present disclosure provides for enhanced pipeline processing using different timing characteristics for aggregated carriers. A receiving device may receive a first component carrier and a second component carrier from a transmitting device during a subframe including a first set of symbols on the first component carrier and a second set of symbols on the second component carrier. The first component carrier may be a priority component carrier having a different timing characteristic than the second component carrier. The receiving device may process, using a hardware processing pipeline, the first set of symbols interleaved with the second set of symbols. The receiving device may transmit an acknowledgment, within the subframe, based on the processing of at least all of the first set of symbols.

30 Claims, 9 Drawing Sheets

(51) Int. Cl.
  *H04L 1/18* (2006.01)
  *H04L 1/00* (2006.01)
(52) U.S. Cl.
  CPC ............ *H04L 1/1887* (2013.01); *H04L 5/001* (2013.01); *H04L 5/0055* (2013.01); *H04W 72/0453* (2013.01)
(58) Field of Classification Search
  CPC ... H04L 1/1887; H04L 1/1854; H04L 1/0071; H04L 1/0047; H04L 5/0055
  USPC .......................................................... 370/329
  See application file for complete search history.

(56) References Cited

U.S. PATENT DOCUMENTS

| | | | |
|---|---|---|---|
| 10,873,425 B2 | 12/2020 | Chen et al. | |
| 2011/0268045 A1* | 11/2011 | Heo | H04L 1/0027 370/329 |
| 2012/0033603 A1* | 2/2012 | Seo | H04L 5/001 370/312 |
| 2012/0320782 A1* | 12/2012 | Seo | H04L 1/1854 370/252 |
| 2016/0043843 A1* | 2/2016 | Liu | H04L 5/0048 370/329 |
| 2017/0064706 A1* | 3/2017 | Patel | H04W 72/0446 |
| 2017/0078058 A1* | 3/2017 | Mariner | H04L 5/0044 |
| 2017/0317794 A1* | 11/2017 | You | H04L 5/0051 |
| 2018/0102881 A1* | 4/2018 | Cheng | H04W 28/04 |

FOREIGN PATENT DOCUMENTS

| | | |
|---|---|---|
| WO | 2013040026 A1 | 3/2013 |
| WO | 2015116767 A1 | 8/2015 |

OTHER PUBLICATIONS

Qualcomm Incorporated, DL processing time consideration, Oct. 10-14, 2016, 9 pages, 3GPP TSG-RAN WG1 #86b R1-166362 (Year: 2016).*

International Search Report and Written Opinion—PCT/US2017/056958—ISA/EPO—dated Jan. 25, 2018. 15 pages.

Qualcomm Incorporated: "DL processing Time Consideration", 3GPP Draft; R1-1610181, 3rd Generation Partnership Project (3gpp), Mobile Competence Centre, 650, Route Des Lucioles, F-06921 Sophia-Antipolis Cedex, France, vol. RAN WG1, Lisbon, Portugal; Oct. 9, 2016, XP051150201, Retrieved from the Internet: URL:http://www.3gpp.org/ftp/Meetings_3GPP_SYNC/RAN1/Docs/ [retrieved on Oct. 9, 2016], 9 pages.

Qualcomm Incorporated: "Self-Contained Subframe Timeline Analysis", 3GPP Draft; R1-166362, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 21, 2016, XP051140182, Retrieved from the Internet: URL:http://www.3gpp.org/ftp/Meetings_3GPP Sync/RAN1 /Docs/ [retrieved on Aug. 21, 2016], 7 pages.

Ericsson, et al., "TDD Special Subframe Configuration for Carrier Aggregation", TSG-RAN WG1 #63: R1-106330, Jacksonville, USA, Nov. 15-19, 2010, 2 Pages.

* cited by examiner

US 11,160,071 B2

CARRIER AGGREGATION WITH SELF-CONTAINED SUBFRAME FOR EFFICIENT MODEM PROCESSING

CLAIM OF PRIORITY UNDER 35 U.S.C. § 119

This application claims priority to U.S. Provisional Application No. 62/409,594, titled "CARRIER AGGREGATION WITH SELF-CONTAINED SUBFRAME FOR EFFICIENT MODEM PROCESSING," filed Oct. 18, 2016, which is assigned to the assignee hereof, and incorporated herein by reference in its entirety.

BACKGROUND

Aspects of this disclosure relate generally to telecommunications, and more particularly to resource management in wireless communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, 5G new radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond. Preferably, these improvements should be applicable to other multi-access technologies and the telecommunication standards that employ these technologies.

It is envisaged that 5G NR will, in some cases, be deployed in time division duplexing (TDD) bands using very large spectrum (e.g., greater than 100 MHz). Due to the large spectrum, devices may be able to complete transmission of available data relatively quickly. The large spectrum, however, may require a receiver to process of numerous code blocks for a symbol period. In an aspect, a latency target may be a target time for a receiver to acknowledge a transmission. For example, in a self-contained subframe, the latency target may be the end of the subframe. For example, a latency target may be on the order of 1 or 2 milliseconds. When the large spectrum is combined with the low-latency features of 5G NR, receiver processing operations may present a peak processing hot spot or bottleneck that may drive hardware and power consumption costs. That is additional hardware capacity may be needed to meet the latency targets. The hardware, however, may go unused a majority of the time.

In view of the foregoing, improvements to minimize hardware costs and energy consumption while meeting bandwidth and latency targets is desirable.

SUMMARY

The present disclosure provides for modem processing of received component carriers having different timing characteristics in a manner that reduces processing time of at least a priority carrier. In an aspect, the disclosure provides a method of subframe processing for wireless communications. The method may include receiving a first component carrier and a second component carrier from a transmitting device during a subframe including a first set of symbols on the first component carrier and a second set of symbols on the second component carrier. The first component carrier may be a priority component carrier having a different timing characteristic than the second component carrier. The method may include processing, using a hardware processing pipeline, the first set of symbols interleaved with the second set of symbols. The method may include transmitting an acknowledgment based on the processing of at least all of the first set of symbols within the subframe.

In another aspect, the disclosure provides an apparatus for pipeline processing in wireless communications. The apparatus may include a memory, a receiver, and a processor coupled to the memory and the receiver. The memory may include instructions executable by the processor to receive, via the receiver, a first component carrier and a second component carrier from a transmitting device during a subframe including a first set of symbols on the first component carrier and a second set of symbols on the second component carrier. The first component carrier may be a priority component carrier having a different timing characteristic than the second component carrier. The processor may be configured to process the first set of symbols interleaved with the second set of symbols, wherein the processor includes a processing pipeline. The processor may be configured to transmit, within the subframe, an acknowledgment based on the processing of at least all of the first set of symbols.

In another aspect, the disclosure provides another apparatus for pipeline processing in wireless communications. The apparatus may include means for receiving a first component carrier and a second component carrier from a transmitting device during a subframe including a first set of symbols on the first component carrier and a second set of symbols on the second component carrier. The first component carrier is a priority component carrier having a different timing characteristic than the second component carrier. The apparatus may include means for processing, using a hardware processing pipeline, the first set of symbols interleaved with the second set of symbols. The apparatus may include means for transmitting, within the subframe, an acknowledgment based on the processing of at least all of the first set of symbols.

In another aspect, the disclosure provides a computer readable medium storing computer executable code for wireless communications. The computer readable medium may include code for receiving a first component carrier and a second component carrier from a transmitting device during a subframe including a first set of symbols on the first component carrier and a second set of symbols on the second component carrier, wherein the first component carrier is a priority component carrier having a different timing characteristic than the second component carrier. The computer readable medium may include code for processing, using a hardware processing pipeline, the first set of symbols interleaved with the second set of symbols. The computer readable medium may include code for transmitting, within the subframe, an acknowledgment based on the processing of at least all of the first set of symbols.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
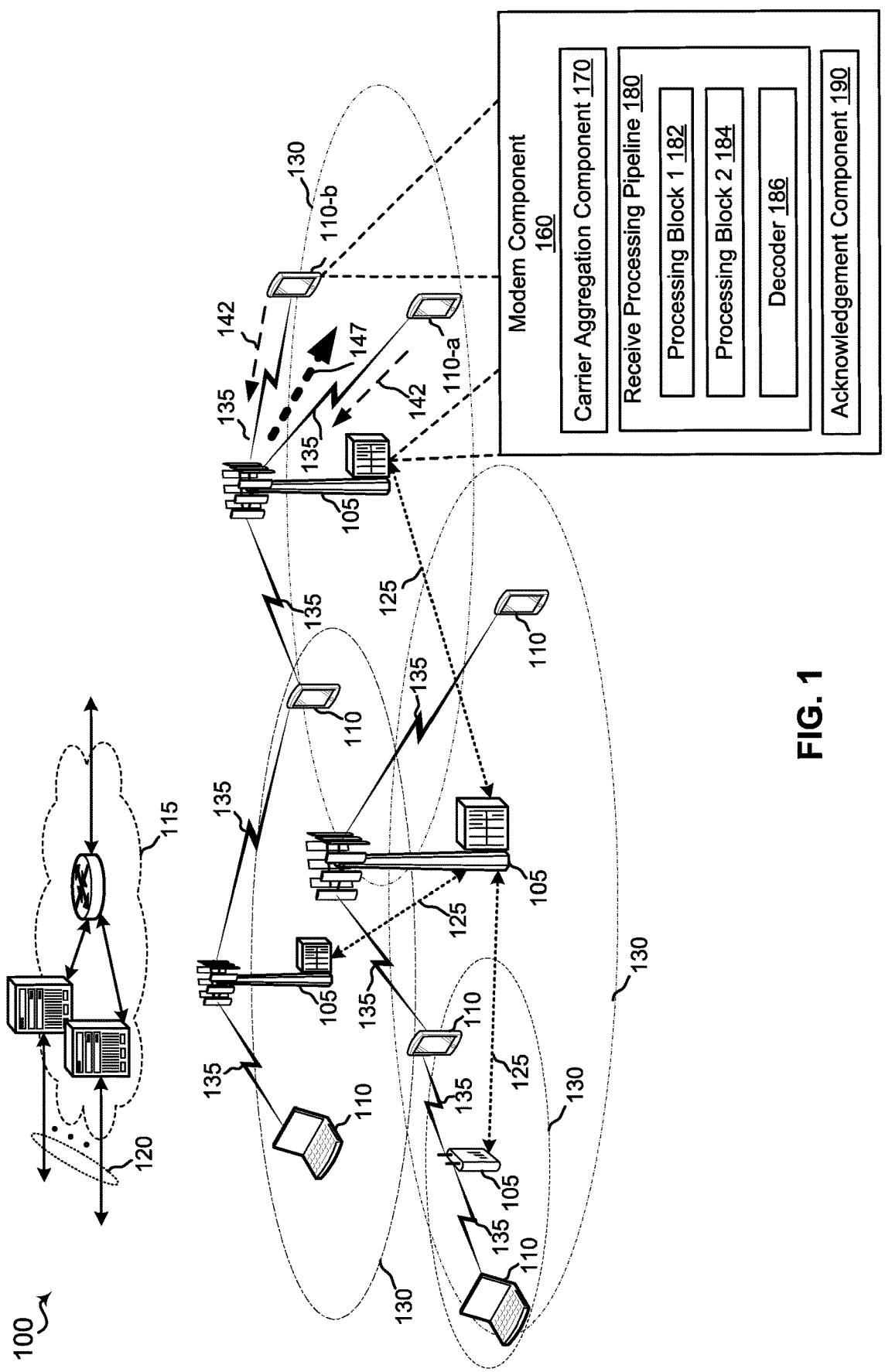
FIG. 1 is a schematic diagram of a wireless communication network in accordance with an example implementation of the present disclosure.

As discussed above, emerging 5G or New Radio (NR) communications technology, may employ large spectrum and have low latency targets. For example, in a self-contained subframe, a receiver may be expected to receive data during a data portion of the subframe and transmit an acknowledgment (ACK) at the end of the same subframe. In an aspect, such a self-contained subframe presents a processing bottleneck or hotspot for the last symbol in the data portion, which must be quickly decoded to determine the ACK. Accordingly, the low latency target may drive peak hardware capability.

Pipelining is a technique for improving the utilization of hardware processing blocks without substantially increasing chip area. If the pipeline depth is longer than the time available from the last symbol to the ACK, the last symbol may require padding or tapering. A shorter pipeline depth may be used to meet a latency target. A shorter pipeline depth, however, means adding hardware capability. Increasing hardware capability, however, may not be ideal because, for example, the additional hardware capability added to meet peak processing points may not be utilized during normal processing.

Some aspects of the present disclosure provide for efficient processing pipelining at the modem of a wireless communication device, with a general aim to reduce communication latency even in a wide bandwidth network. Various aspects of the disclosure provide for reducing pipeline processing demands using carrier aggregation techniques. Different component carriers may have different timing characteristics that allow a latency target to be met for each of the component carriers. A transmitter may schedule data on the component carriers based on the timing characteristics such that the receiver may decode the data and meet a respective latency target for transmitting the ACK for each component carrier.

Various aspects are now described in more detail with reference to the FIGS. 1-11. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 having a modem component 160 configured to perform one or more techniques described herein. A base station 105 may also include a modem component 160 configured to perform similar or complementary techniques described herein at the base station 105.

In particular, modem component 160 may include a carrier aggregation component 170 configured to receive at least two component carriers. The component carriers may be continuous component carriers or non-continuous component carriers. The component carriers may be received via different antennas and be initially processed by different receive chains. For example, the component carriers may be associated with different radio frequency (RF) front ends.

The carrier aggregation component 170 may determine symbols of the component carriers based on timing characteristics of each component carrier. For example, the timing characteristics may determine the number of symbols for each carrier during a sub-frame. The timing characteristics may also determine any offset in the start timing of the symbols on each component carrier. The carrier aggregation component 170 may interleave the symbols from the different components for processing by the receive processing pipeline 180. In an aspect, for example, the carrier aggregation component 170 may alternate symbols from component carriers to provide to the receive processing pipeline 180. If multiple component carriers are used, the carrier aggregation component 170 may use a round-robin method to feed symbols to the receive processing pipeline 180. In an aspect, one of the component carriers may be considered a priority component carrier and the carrier aggregation component 170 may select a first symbol in a subframe from the priority component carrier.

In some examples of the present disclosure, the modem component 160 may further include the receive processing pipeline 180. The receive processing pipeline 180 may be configured to perform modem processing of received symbols. That is, the receive processing pipeline 180 may receive baseband symbols and produce decoded bits. The receive processing pipeline 180 may include a plurality of hardware processing blocks. For example, the receive processing pipeline 180 may include one or more processing blocks (Block 1) 182, (Block 2) 184. The processing blocks 182, 184, may be, for example, vector processors. Each of processing blocks 182, 184 may perform a sequential processing operation. For example, the processing block 182 may determine logarithmic likelihood ratios (LLRs) for each symbol, or each code block, and the processing block 184 may perform a demapper operation. As used herein, a code block (CB) may refer to a self-contained unit that can be decoded into bits. For example, a system utilizing a wide bandwidth, may include many CB during each symbol period. For example, the sub-carriers received during a symbol period may be divided into 30 or more CB. The receive processing pipeline 180 may also include a decoder 186. The decoder 186 may be a specialized hardware block for decoding LLRs for a code block into bits. For example, the decoder 186 may be a Viterbi decoder.

As discussed above, a general approach to improving pipeline processing is to increase hardware capacity by expanding the width of the processing pipeline. For example, the receive processing pipeline 180 may be expanded by adding additional processing blocks or decoders that operate in parallel with the processing blocks 182, 184 and decoder 186.

Additionally, the modem component 160 may further include an acknowledgment component 190 for transmitting an acknowledgment to a transmitting device. For example, the acknowledgment component 190 may perform a cyclic redundancy check (CRC) to determine whether one or more subframes, component carriers, symbols, or CBs were decoded correctly. The acknowledgment component 190 may also transmit an ACK to the transmitting component indicating the decoding status. That is, the acknowledgment component 190 may transmit ACK when the decoding was successful and transmit a negative acknowledgment (NACK) when the decoding was unsuccessful. The ACK/NACK may be used by the transmitting device to determine whether to retransmit the subframe.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, a radio transceiver, a NodeB, eNodeB (eNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G, 4G/LTE, 3G, Wi-Fi, Bluetooth, etc.), and thus there may be overlapping geographic coverage areas 130 for different communication technologies.

In some examples, the wireless communication network 100 may be or include a Long Term Evolution (LTE) or LTE-Advanced (LTE-A) technology network. The wireless communication network 100 may also be a next generation technology network, such as a 5G wireless communication network. Moreover, the wireless communication network 100 may support high frequency operations such as millimeter wave communications. In LTE/LTE-A networks, the term evolved node B (eNB) may be generally used to describe the base stations 105, while the term UE may be generally used to describe the UEs 110. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider. A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In an aspect, the acknowledgment component 190 may operate at the MAC layer. In the control plane, the radio resource control (RRC) protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, relay base stations, and the like.

A UE 110 may be configured to establish one or more wireless communication links 135 with one or more base stations 105. The wireless communication links 135 shown in wireless communication network 100 may carry UL transmissions from a UE 110 to a base station 105, or downlink (DL) transmissions, from a base station 105 to a UE 110. The downlink transmissions may also be called forward link transmissions while the uplink transmissions may also be called reverse link transmissions. In an aspect, in the UL, the base station 105 may be considered a receiving device and a modem component 160 may perform the methods disclosed herein. In an aspect, in the DL, a UE 110 may be considered a receiving device and a modem component 160 at the UE 110 may perform the methods described herein. Each wireless communication link 135 may include one or more carriers, where each carrier may be a signal made up of multiple subcarriers (e.g., waveform signals of different frequencies) modulated according to the various radio technologies described above. Each modulated signal may be sent on a different subcarrier and may carry control information (e.g., reference signals, control channels, etc.), overhead information, user data, etc. In an aspect, the communication links 135 may transmit bidirectional communications using frequency division duplex (FDD) (e.g., using paired spectrum resources) or time division duplex (TDD) operation (e.g., using unpaired spectrum resources). Moreover, in some aspects, the communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers.

Figure 2:
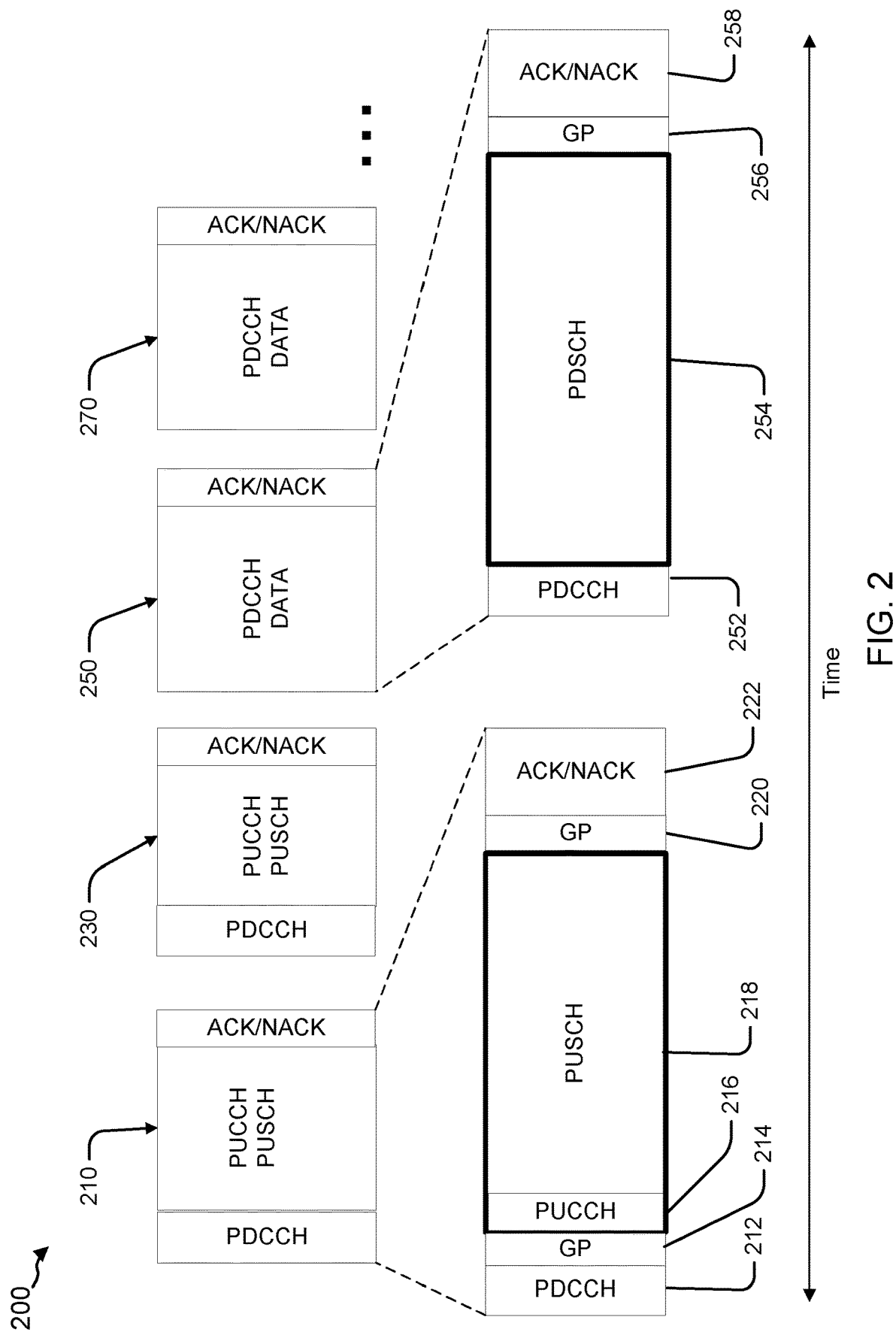
FIG. 2 is an example frame structure utilizing time-division duplexing in accordance with an example implementation of the present disclosure.

FIG. 2 is an example frame structure 200 utilizing time-division duplexing. The frame structure 200 may be used for a burst of traffic in one or both of the uplink or downlink. Each subframe in the frame structure 200 may be either an uplink-centric subframe or a downlink-centric subframe. For example, subframes 210 and 230 may be uplink-centric subframes, and subframes 250 and 270 may be downlink-centric subframes. Each subframe may actually include both uplink and downlink portions. The direction of the subframe may refer to the direction of the data portion. The subframes in frame structure 200 may be referred to as self-contained subframes. A self-contained subframe may include control information, a data portion, and an acknowledgment of the data portion in the same subframe.

For example, the subframe 210 may be an uplink-centric subframe. The subframe 210 may include a physical dedicated control channel (PDCCH) 205 transmitted in a downlink direction that provides initial control information for the subframe 210. The PDCCH 212 may be referred to as an uplink grant because it provides information to a UE for transmitting on the uplink. The PDCCH 212 may be followed by a guard period (GP) 214. The GP 214 may separate a downlink portion of the subframe from an uplink portion. The GP 214 may allow the transmitting device and the receiving device to switch directions. An uplink portion of the subframe 210 may include a physical uplink control channel (PUCCH) 216. The PUCCH may include control information (e.g., reference signals, transmit format, etc.) from the UE 110 regarding a physical uplink shared channel (PUSCH) 218. The PUSCH 218 may include encoded data transmitted in the uplink by the UE 110. As will be discussed in further detail below, the PUSCH may include multiple symbols transmitted over a wide bandwidth using multiple component carriers using carrier aggregation. The PUSCH may be followed by another GP 220 to allow the base station 105 process the PUSCH 218. The base station 105 may then transmit the ACK/NACK 222 indicating whether the base station 105 correctly decoded the PUSCH 218. In some examples, the ACK/NACK 222 may be combined with the PDCCH 212 of the following subframe.

Subframe 250 may be an example of a downlink centric subframe. The subframe 250 may include a PDCCH 252 transmitted by the base station 105. The PDCCH 252 may be referred to as a downlink grant because PDCCH 252 carries information for a UE 110 to receive a physical downlink shared channel (PDSCH) 254. In a downlink centric subframe, there is no need for a GP between the PDCCH 252 and the PDSCH 254 because both the PDCCH 252 and the PDSCH 254 are in the downlink direction. The PDSCH 254 may carry multiple symbols transmitted over a wide bandwidth using multiple component carriers using carrier aggregation. The modem component 160 of the UE 110 may receive and decode the PDSCH 254. The subframe 250 may further include a GP 256 allowing the UE 110 to finish decoding the PDSCH 254. The subframe 210 may include an ACK/NACK 258 transmitted by the UE 110 indicating whether the PDSCH 254 was correctly decoded.

Figure 3:
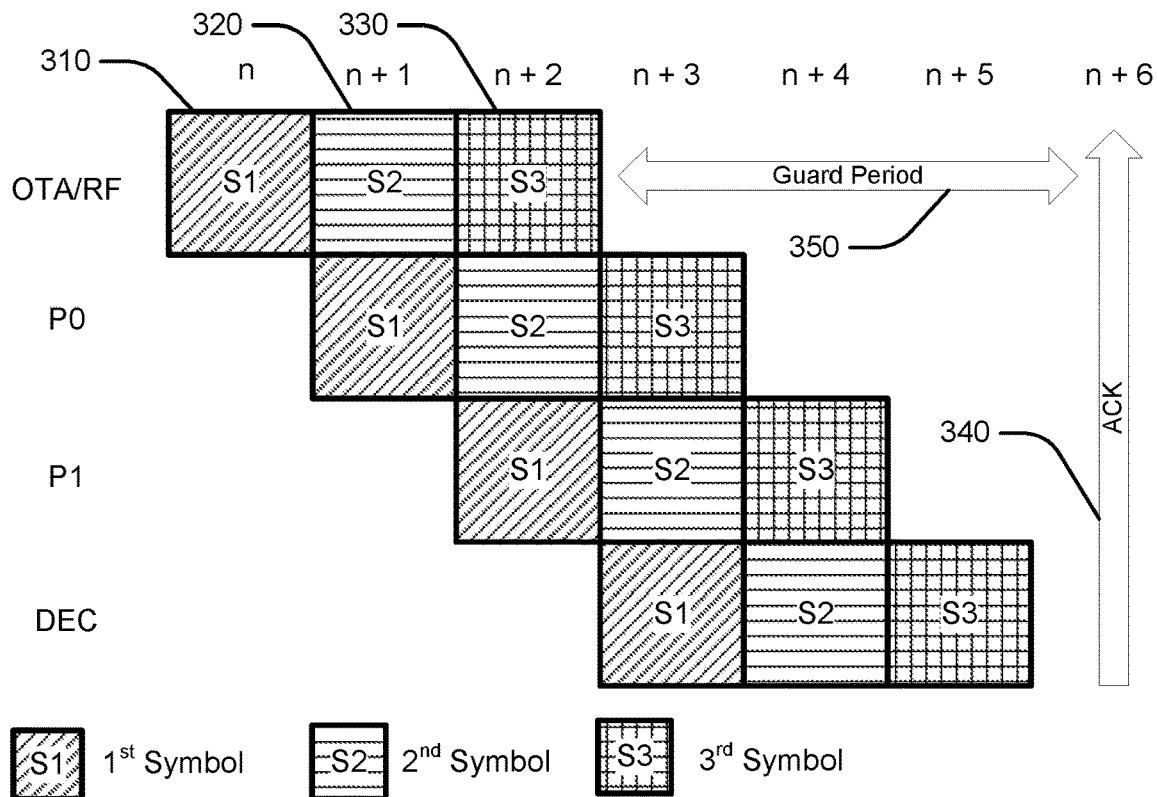
FIG. 3 is a conceptual diagram showing an example of resource allocation for pipeline processing.

FIG. 3 is a conceptual diagram showing an example of resource allocation for pipeline processing. The resource allocation may be used, for example, by the receive processing pipeline 180. As illustrated, a symbol 310 is received over the air (OTA) for example as an RF signal at time n. Columns refer to the OFDM symbols. The symbol 310 is fed to a first processing block 182 (P0) at time n+1. The different rows, P0, P1, and DEC, refer to the example processors and decoder usage as shown in FIG. 1. When P0 finishes processing, the symbol 310 is fed to a second processing block 184 (P1) at time n+2. Meanwhile, at time n+1, a second symbol, 320 is received OTA and begins working through the processing pipeline 180 starting at time n+2. Once the P2 finishes processing the symbol 310, the symbol 310 is fed to the decoder 186 (DEC) at time n+3. As illustrated three symbols 310, 320, 330 are processed through the pipeline. In this case, processing the third symbol finishes at n+5, and an ACK 340 may be transmitted at n+6. The ACK is represented by the vertical arrow labeled "ACK" on the right of FIG. 3. The arrow indicates the earliest ACK possibility for the transport block (contained within a transmission time interval (TTI)), which spans over multiple symbols and contains many codeblocks. Accordingly, a guard period 350 may be used between the end of the third symbol 330 received OTA and the transmission of the ACK 340.

Figure 4:
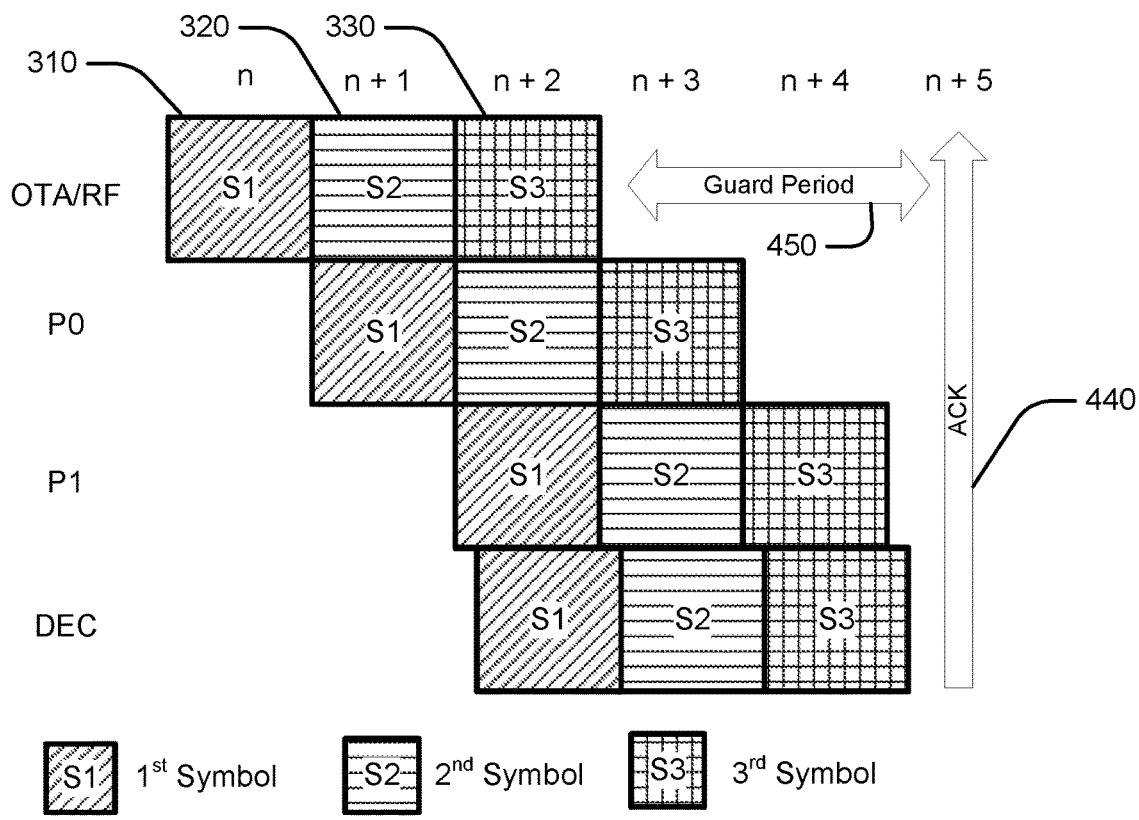
FIG. 4 is a conceptual diagram showing an example technique for enhancing pipeline processing.

FIG. 4 is a conceptual diagram showing an example technique for enhancing pipeline processing. In this case, the second processing block 184 may pipeline with the decoder 186 (shown as row DEC in FIG. 4) at a finer granularity than the symbol level. For example, the second processing block 184 (shown as row P1 in FIG. 4.) may run a demapper operation and may be able to pipeline with the decoder 186 at a code block level. That is, the decoder 186 may start processing the same symbol as soon as the first CB from that symbol becomes available from the output of the processing block 184. In the case where a symbol period includes many code blocks, the processing delay before the decoder 186 may start processing may be negligible. Similarly, the time the decoder 186 finishes after the second processing block 184 may be negligible. Such negligible difference may be managed by slightly increasing the clock speed. Accordingly, in this example, the ACK 440 may be transmitted at time n+5 and the guard period may be shortened such that guard period 450 may be shorter than guard period 350 in FIG. 3.

Figure 5:
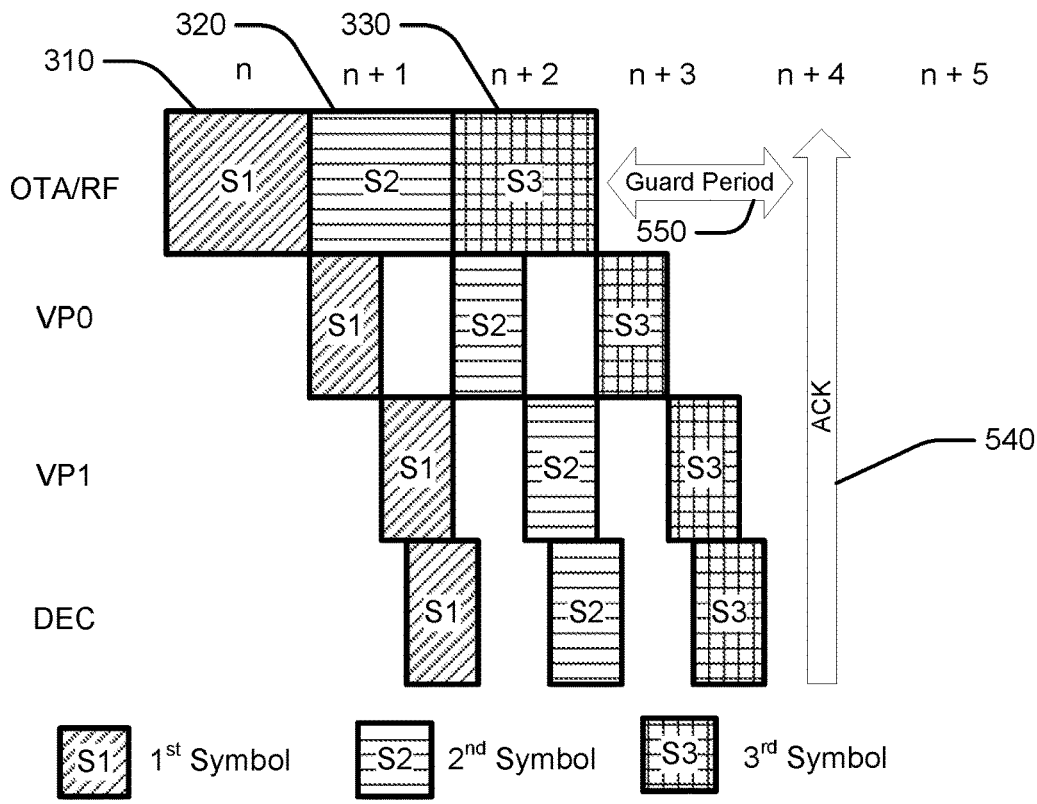
FIG. 5 is a conceptual diagram showing another example technique for enhancing pipeline processing.

FIG. 5 is a conceptual diagram showing another example technique for enhancing pipeline processing. In this case, the hardware capabilities of the processing pipeline 180 may be increased (e.g., by adding additional processing blocks and decoders). The increased capacity may also be achieved by significantly increasing the clock speed. For example, FIG. 5 illustrates a doubled capacity compared to FIG. 4. In this case, the increased processing capabilities allow the processing pipeline 180 to process the third symbol 330 in a shorter time. Accordingly, the ACK 540, may be transmitted at time n+4 and the guard period 550 may be shorter than the guard period 450. By enhancing the peak capability of the hardware, however, the hardware duty cycle may not be fully utilized. In this example, the hardware utilization is roughly half of the previous example. Accordingly, even though additional hardware capability is being provided, merely adding hardware capacity may not be efficient in terms of costs paid to reduce latency.

Figure 6:
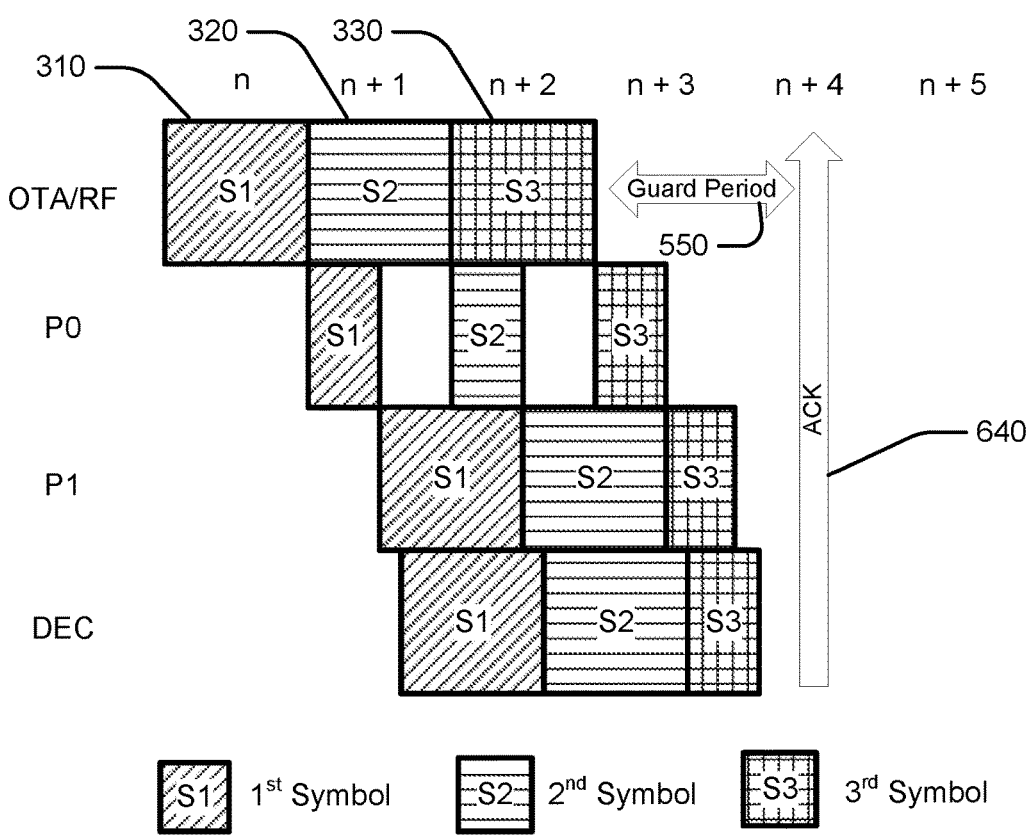
FIG. 6 is a conceptual diagram showing yet another example technique for enhancing pipeline processing.

FIG. 6 is a conceptual diagram showing another example technique for enhancing pipeline processing. In this case, the hardware capabilities of the processing pipeline 180 may be increased as in FIG. 5, but may not be used for every time slot. For example, a modem component 160 may be provisioned with additional hardware (e.g. additional processing blocks or decoders, which utilize additional chip space and is more expensive). In another example, the increased capacity may also be achieved by increasing clock speed. The additional hardware capabilities may be utilized dynamically. For example, the hardware capabilities may be powered only when needed. In an aspect, the increased capabilities may be utilized by P0 in every time slot, and used by P1 and DEC only for processing the third symbol 330. Accordingly, the symbol 310 may finish processing at time n+3 and the ACK 640 may be transmitted at time n+4. The guard period 550 in this example may be maintained compared to the example described above in connection with FIG. 5. This dynamic switching of hardware allocation may help lower average power consumption by spreading out the processing load for a majority of processing stages and for a majority of the symbols. However, this technique may not reduce the costs of increased hardware provisioning in that this technique uses the same hardware as in FIG. 5.

Figure 7:
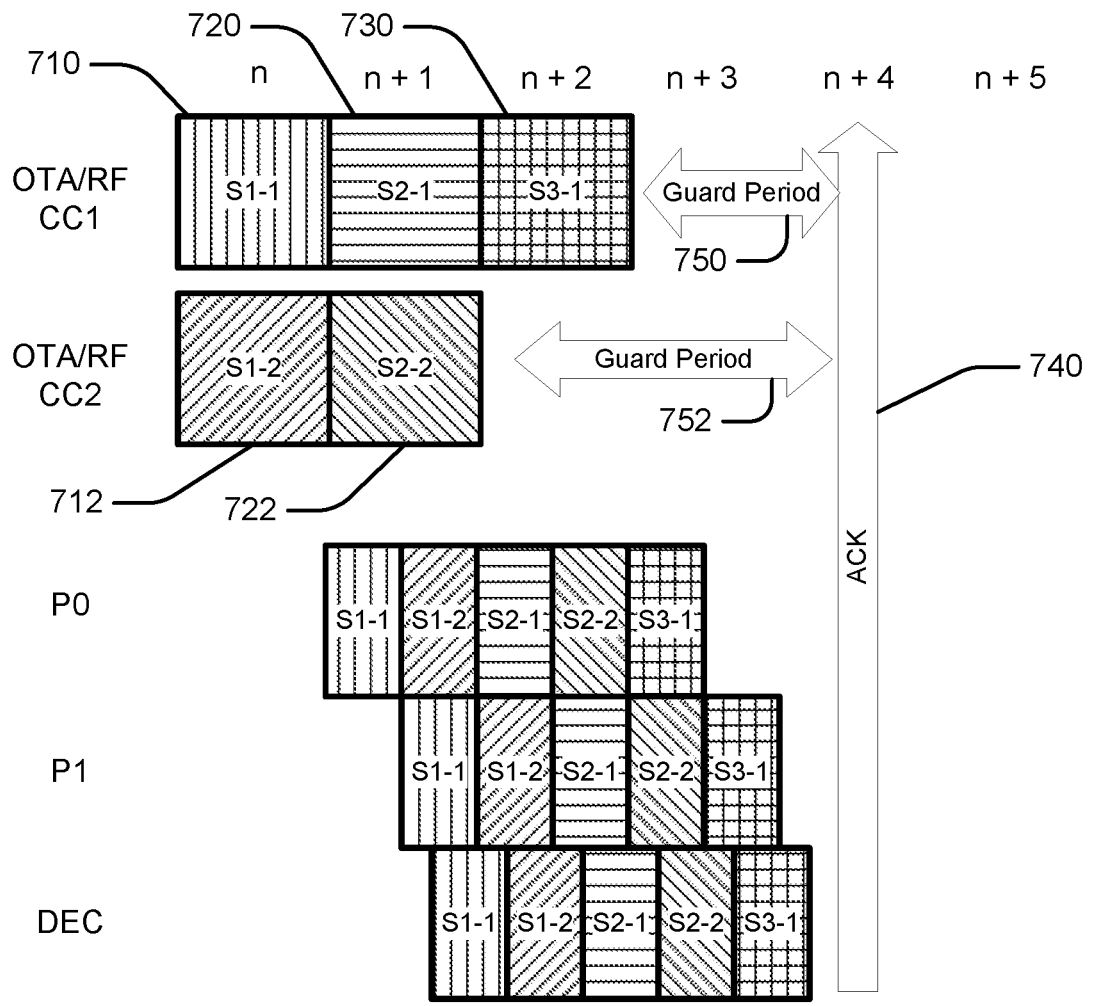
FIG. 7 is a conceptual diagram showing an example technique for enhancing pipeline processing using carrier aggregation in accordance with an implementation of the present disclosure.

FIG. 7 is a conceptual diagram showing an example technique for enhancing pipeline processing using carrier aggregation. In this example, data may be transmitted on two component carriers CC1 and CC2. The two component carriers may have different timing characteristics. In this example, CC1 may be associated with a first guard period 750 that is different than a second guard period 752 associated with CC2. The component carrier with the smallest guard period would be more time sensitive, and should be processed first in the pipeline shared across component carriers. The component carrier with the largest guard period would be processed last. In an aspect, a UE 110 may signal a UE capability indicating which timing characteristic differences are supported for different component carriers. A base station 105 may select one or more timing characteristic differences to apply in a carrier aggregation configuration. In an aspect, for example, CC2 may carry fewer symbols during a transmission block (e.g., PDSCH 254) than CC1. It should be appreciated that although three symbols are illustrated for CC1 and two symbols for CC2, in practice, a larger number of symbols may be carried by each CC depending on the duration of a subframe and the numerology being used. It should also be appreciated that because the symbols are being transmitted on two component carriers, in comparison to FIGS. 3-6, each component carrier may use less bandwidth, but the total bandwidth may remain constant.

The carrier aggregation component 170 may interleave the received symbols for feeding to the processing pipeline 180. For example, the carrier aggregation component 170 may select a symbol from a priority CC as the first symbol, then alternate symbols or select symbols in a round-robin manner if multiple CC are available. Each of the processing blocks 182, 184, and the decoder 186 (shown as P0, P1 and DEC in FIG. 7) may process the symbols 710, 712, 720, 722, 730 in less time than the symbols 310, 320, 330 because the symbols use less bandwidth. For example, if the symbols use half of the bandwidth, each processing block may process the symbol in approximately half of the time. Accordingly, as illustrated, the processing pipeline 180 may complete processing of the five symbols at time n+3, and the ACK 740 may be transmitted at time n+4. That is, the same target latency for the ACK 740 can be met using component carriers without increasing hardware capability. The hardware may be operated with a high duty cycle, only being idle when waiting for the first symbol received OTA. In an aspect, this technique may reduce throughput on the component carrier with the longer guard period. However, the reduction may be a single symbol. Accordingly, when a larger number of symbols are transmitted in a sub-frame, the loss of throughput may be negligible.

Figure 8:
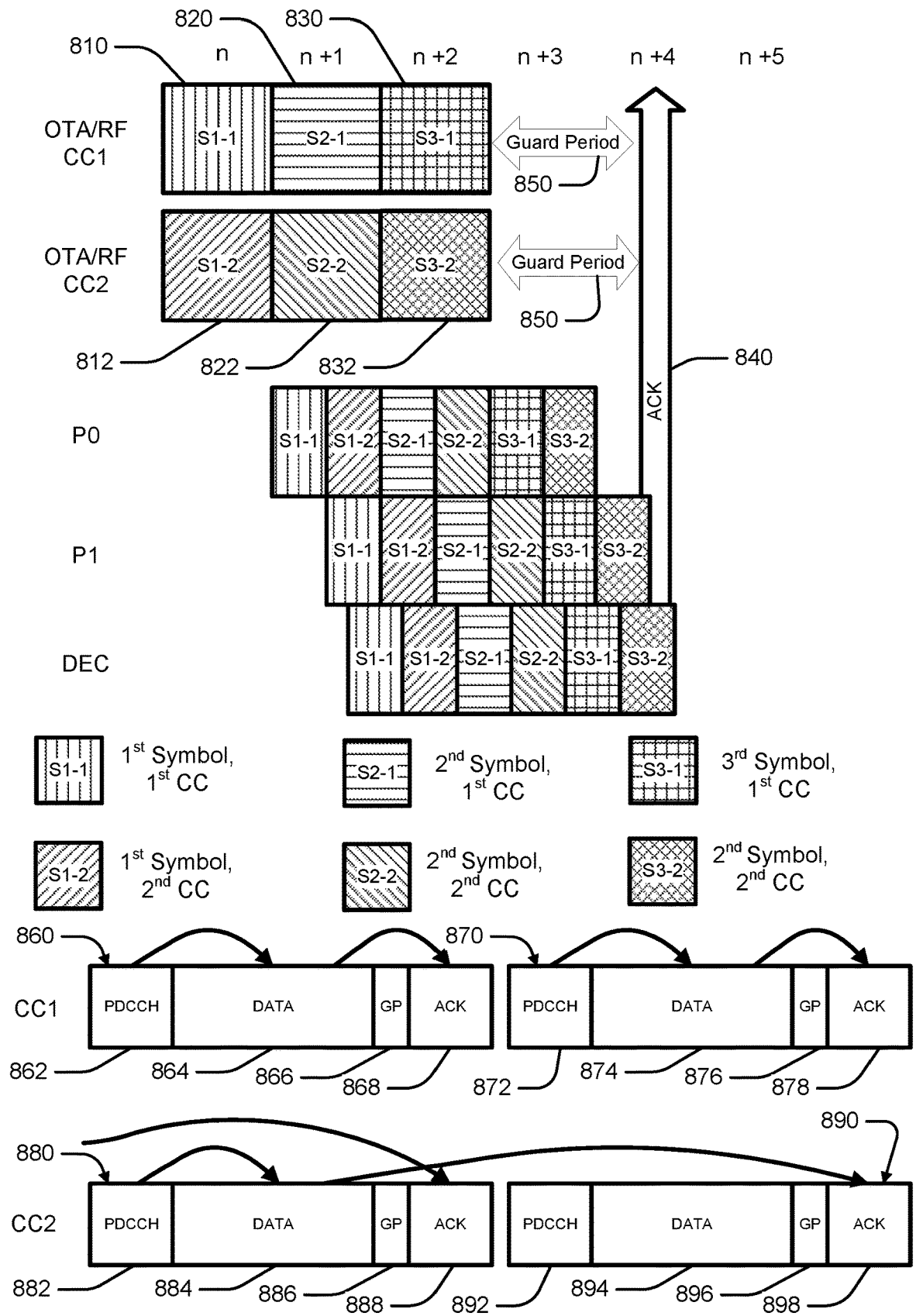
FIG. 8 is a conceptual diagram showing another example technique for enhancing pipeline processing using carrier aggregation in accordance with an implementation of the present disclosure.

FIG. 8 is a conceptual diagram showing another example technique for enhancing pipeline processing using carrier aggregation. Once again, a timing characteristic may be different for CC1 and CC2. In this example, an ACK latency target may be different between the CCs. For a priority CC1, the ACK may be transmitted in the same subframe as the data. That is, CC1 may carry self-contained subframes. The subframe 860 may include a PDCCH 862, data 864, GP 866, and ACK 868. The subframe 870 may include a PDCCH 872, data 874, GP 876, and ACK 878. For example, in subframe 860, the data 864 may be acknowledged by the ACK 868, and in subframe 870, the data 874 may be acknowledged by the ACK 878. The CC1 may have two hybrid automatic repeat request (HARD) interlaces. Subframes in CC2 may have a relaxed ACK latency target. The subframe 880 may include a PDCCH 882, data 884, GP 886, and ACK 888. The subframe 890 may include a PDCCH 892, data 894, GP 896, and ACK 898. In an aspect, the ACK for subframe 880 on CC2 may be transmitted in the subsequent subframe 890. For example, the data 884 may be acknowledged by the ACK 898. Accordingly, CC2 may have three HARQ interlaces.

Each of the component carriers may carry the same number of symbols and have the same guard period 850. As illustrated, the processing pipeline 180 may not finish processing a last symbol 832 of CC2 by the end of the guard period 850. In this example, due to the relaxed latency target and acknowledgment schedule for CC2, the ACK 840 may acknowledge symbols 810, 820, and 830 for CC1 and the symbols of the previous subframe (not shown) for CC2. The symbols 812, 822, and 832 may be acknowledged in the subsequent subframe. In this case, although CC2 may not be a self-contained subframe, a transmitting device may be able to meet a low latency target by scheduling time critical data on CC1. It should also be noted that although the P0 and DEC are still processing the symbol 832 for CC2, the ACK 840 may still be transmitted for the current subframe of CC1 and the previous subframe of CC2. Once again, use of carrier aggregation allows the latency target to be met on CC1 without increasing hardware capability. Further, the hardware is operated with a high duty cycle.

Figure 9:
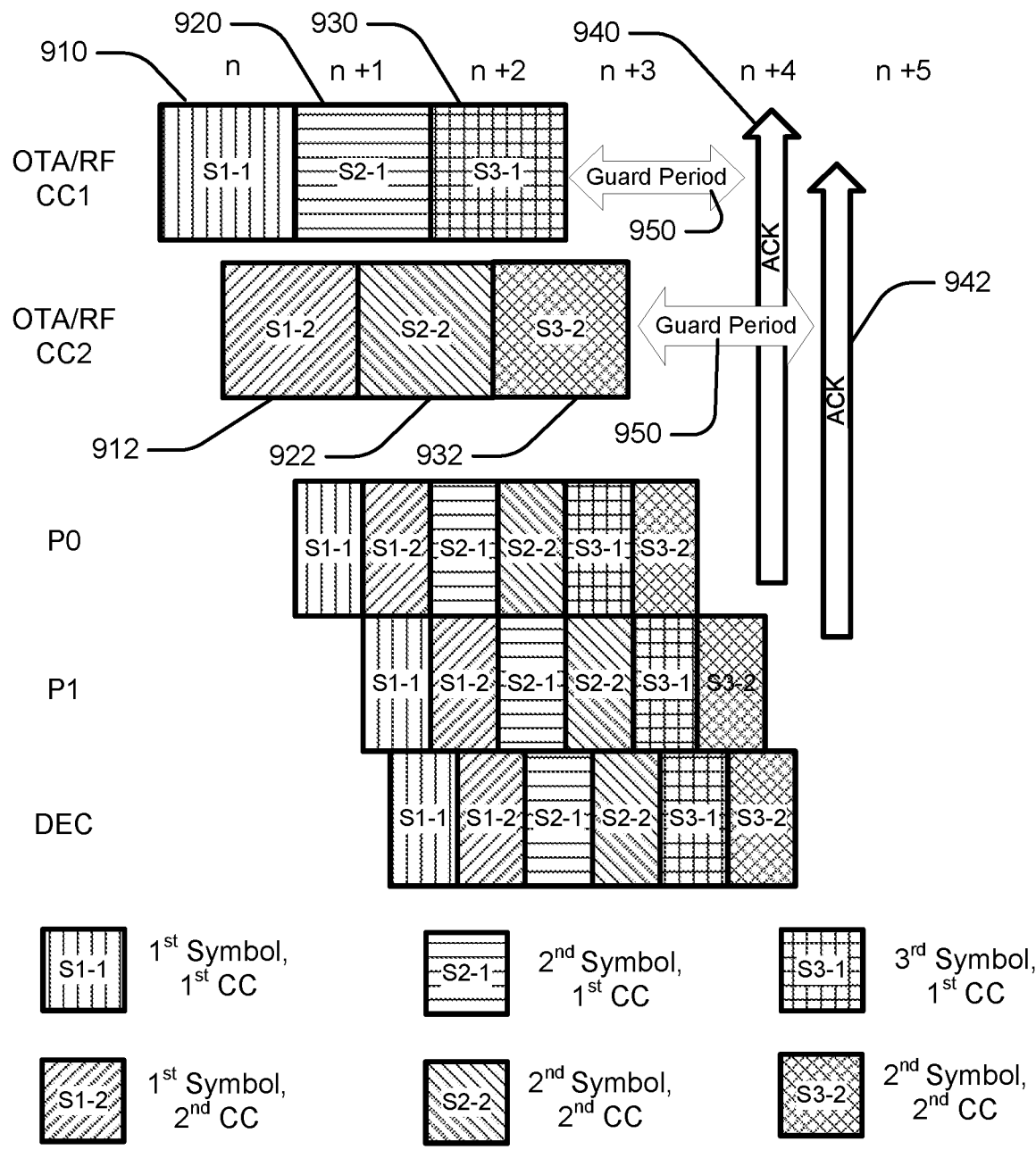
FIG. 9 is a conceptual diagram showing yet another example technique for enhancing pipeline processing using carrier aggregation in accordance with an implementation of the present disclosure.

FIG. 9 is a conceptual diagram showing another example technique for enhancing pipeline processing using carrier aggregation. Once again, a timing characteristic may be different for CC1 and CC2. In this example, a subframe timing may be different between CC1 and CC2. For example, a subframe on CC2 may be offset from a subframe timing of CC1. The offset may be less than a symbol period. The offset could be due to timing misalignment between component carriers in an asynchronous carrier aggregation deployment. The offset could also be introduced by design in a synchronous carrier aggregation deployment. Each component carrier may be transmitted with the same number of symbols and the same guard period 950. When the processing pipeline 180 finishes processing the symbol 930 for CC1, an ACK 940 may be transmitted for CC1. When the processing pipeline 180 finishes processing the symbol 932 for CC2, an ACK 942 may be transmitted for CC2. As seen in FIG. 9, the ACK timing may be staggered.

In an aspect, the offset between the sub-frame timings may result in more opportunities for DL-UL or UL-DL interference. For example, the transmission of ACK 942 may effectively shorten the guard period between the ACK 940 and a following PDCCH on CC1. To avoid such interference, an inter-subframe guard period may be increased. Although an increased guard period may reduce spectral efficiency, the reduction may be an acceptable tradeoff. For example, when a guard period budget relative to round trip delay (RTD) is not an issue, the increased guard period may be acceptable. In another aspect where longer durations are allocated for ACK, the offset between ACK 940 and ACK 942 may still comply with the longer duration. In another aspect, there may be sufficient isolation between CC1 and CC2 such that interference is minimal or can be cancelled. For example, a full duplex system may be able to receive ACK 942 while transmitting a PDCCH. Also, in the case of uplink centric subframes, the ACK 942 may be transmitted in the downlink and the PDCCH of the subsequent subframe may be transmitted in the same direction, so no inter-subframe guard period may be needed.

Figure 10:
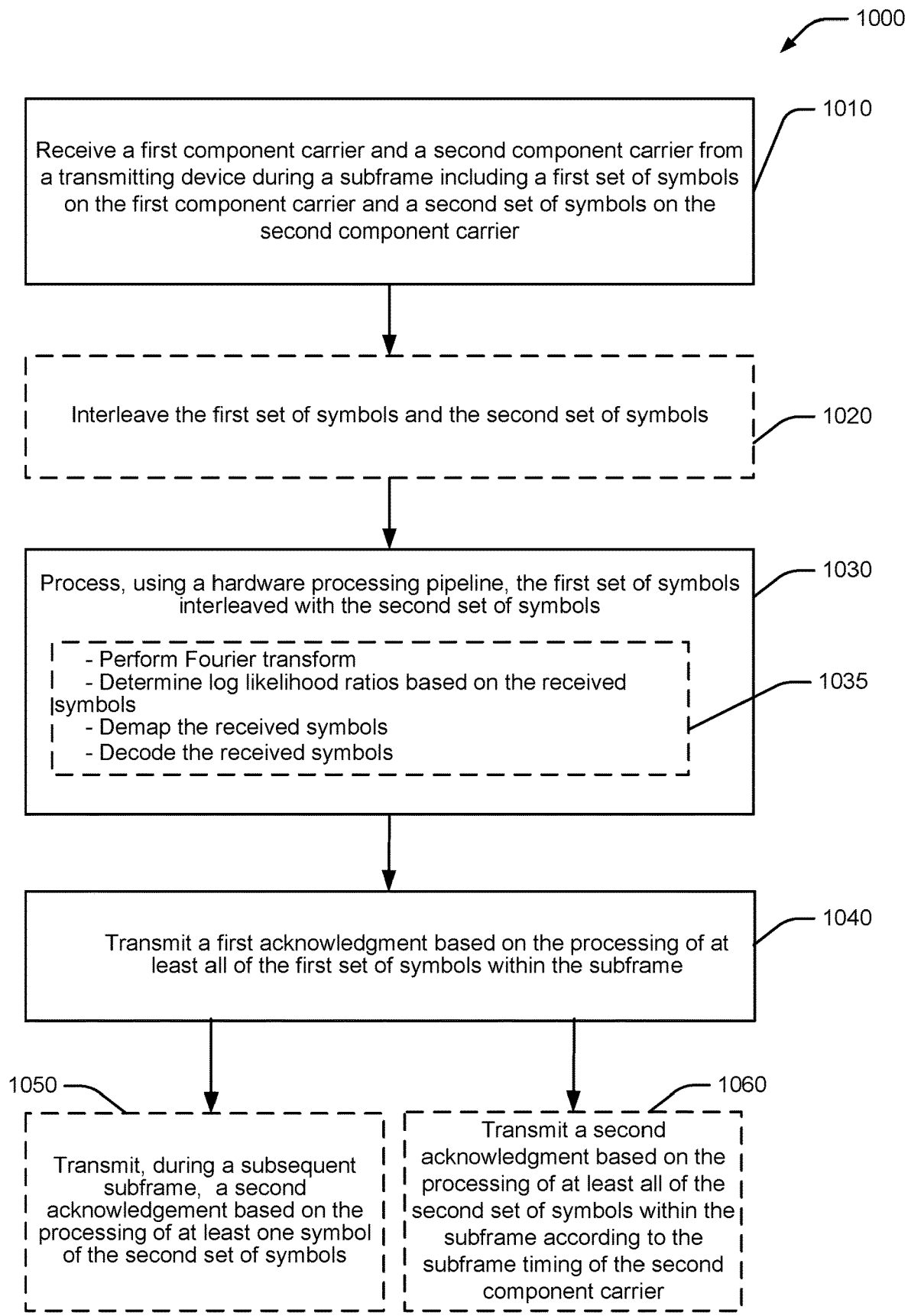
FIG. 10 is a flowchart of an example method of pipeline processing using carrier aggregation for wireless communication in accordance with an implementation of the present disclosure.

FIG. 10 is a flowchart of an example method 1000 of wireless communications. The method 1000 may be performed using an apparatus (e.g., the UE 110 or a base station 105, for example). Although the method 1000 is described below with respect to the elements of the modem component 160, other components may be used to implement one or more of the steps described herein.

In block 1010, the method 1000 may include receiving a first component carrier and a second component carrier from a transmitting device during a subframe including a first set of symbols on the first component carrier and a second set of symbols on the second component carrier. In an aspect, for example, the carrier aggregation component 170 may receive the first component carrier and the second component carrier from a transmitting device (e.g., base station 105) during a subframe including a first set of symbols on the first component carrier and a second set of symbols on the second component carrier. The first component carrier may be a priority component carrier having a different timing characteristic than the second component carrier. The carrier aggregation component 170 may also receive additional component carriers, which may have the same timing characteristic as the priority component carrier, or different timing characteristic. In an aspect, the timing characteristic may be a length of a guard period between receiving a last symbol of the respective first set of symbols and the respective second set of symbols and transmitting the acknowledgment. In another aspect, the timing characteristic is a latency target for the respective component carriers. The latency target may also correspond to a number of HARQ interlaces. In another aspect, the timing characteristic may be a subframe timing. For example, the subframe timing of the second component carrier may be offset from the timing of the first component carrier (e.g., delayed by less than a symbol period).

In block 1020, the method 1000 may optionally include interleaving the first set of symbols and the second set of symbols. In an aspect, for example, the carrier aggregation component 170 may interleave the first set of symbols and the second set of symbols. For example, the carrier aggregation component 170 may select symbols from alternating component carriers starting with the priority component carrier. If multiple component carriers are received, the carrier aggregation component 170 may select symbols in a round-robin manner.

In block 1030, the method 1000 may include processing, using a hardware processing pipeline, the first set of symbols interleaved with the second set of symbols. In an aspect, for example, the processing pipeline 180 may process the first set of symbols interleaved with the second set of symbols. For example, the processing may optionally include, in sub-block 1035, any of: performing a Fourier transform, determining log likelihood ratios based on the received symbols, demapping the received symbols, or decoding the received symbols. In an aspect, the processing pipeline 180 may include a hardware block (e.g., processing block 182, processing block 184, decoder 186) for each processing operation. The receive processing pipeline 180 may interleave the first set of symbols and the second set of symbols to produce an interleaved set of symbols. Receive processing pipeline 180 may then sequentially process the interleaved set of symbols using the hardware blocks.

In block 1040, the method 1000 may include transmitting, within the subframe, a first acknowledgment based on the processing of at least all of the first set of symbols. In an aspect, for example, the acknowledgment component 190 may transmit (e.g., via a transmitter) the first acknowledgment based on the processing of at least all of the first set of symbols within the subframe. The acknowledgment may be either an ACK or a NACK depending on the result of the processing. In an aspect, the first acknowledgment may also be based on processing of all of the second set of symbols. For example, if the processing pipeline 180 has finished processing both the first set of symbols and the second set of symbols at the end of a guard period for the first component carrier, the first acknowledgment may correspond to both the first set of symbols and the second set of symbols.

In block 1050, the method 1000 may optionally include transmitting, during a subsequent subframe, a second acknowledgment based on the processing of at least one symbol of the second set of symbols. In an aspect, for example, the acknowledgment component 190 may transmit, during the subsequent subframe, the second acknowledgment based on the processing of at least one symbol of the second set of symbols. The processing may occur during the original subframe, but the acknowledgment may be sent during the subsequent subframe. The second acknowledgment may correspond to the second set of symbols that are received on the second component carrier. Accordingly, the second set of symbols may be associated with a relaxed latency target.

In block 1060, the method 1000 may optionally include transmitting a second acknowledgment based on the processing of at least all of the second set of symbols within the subframe according to a subframe timing of the second component carrier. In an aspect, for example, the acknowledgment component 190 may transmit the second acknowledgment based on the processing of at least all of the second set of symbols within the subframe according to the subframe timing of the second component carrier. The subframe timing of the second component carrier may be offset from the subframe timing of the first component carrier. For example, the second acknowledgment may be transmitted after the first acknowledgment. The timing offset may be less than a symbol period.

Figure 11:
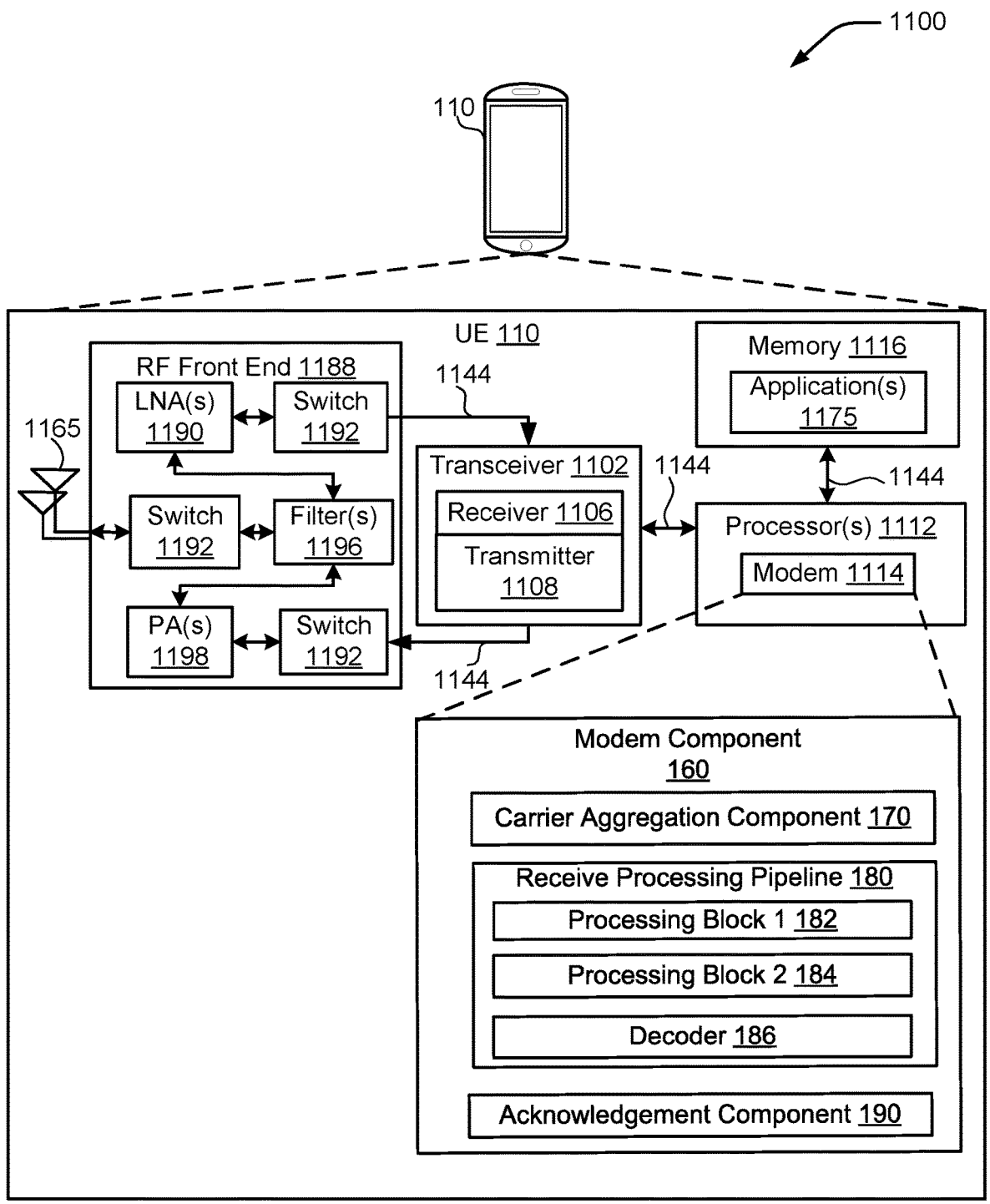
FIG. 11 is a schematic diagram of an aspect of an implementation of various components of the UE configured for communicating with a base station, in accordance with various aspects of the present disclosure.

FIG. 11 schematically illustrates hardware components and subcomponents of the UE 110 for implementing one or more methods (e.g., method 1000) described herein in accordance with various aspects of the present disclosure. For example, one example of an implementation of UE 110 may include a variety of components, some of which have already been described above, but including components such as one or more processors 1112 and memory 1116 and transceiver 1102 in communication via one or more buses 1144, which may operate in conjunction with the modem component 160 to enable one or more of the functions described herein related to including one or more methods of the present disclosure. Further, the one or more processors 1112, modem 1114, memory 1116, transceiver 1102, RF front end 1188 and one or more antennas 1165, may be configured to support voice and/or data calls (simultaneously or non-simultaneously) in one or more radio access technologies. Although FIG. 11 illustrates a UE 110, it should be appreciated that a base station 105 may be implemented using similar components and sub-components (as illustrated in FIG. 1).

In an aspect, the one or more processors 1112 can include a modem 1114 that uses one or more modem processors. The various functions related to modem component 160 may be included in modem 1114 and/or processors 1112 and, in an aspect, can be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 1114 associated with modem component 160 may be performed by transceiver 1102.

Also, memory 1116 may be configured to store data used herein and/or local versions of applications or modem component 160 and/or one or more of its subcomponents being executed by at least one processor 1112. Memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes defining modem component 160 and/or one or more of its subcomponents, and/or data associated therewith, when UE 110 is operating at least one processor 1112 to execute UE modem component 160 and/or one or more of its subcomponents.

Transceiver 1102 may include at least one receiver 1106 and at least one transmitter 1108. Receiver 1106 may include hardware, firmware, and/or software code executable by a processor for receiving data, the code comprising instructions and being stored in a memory (e.g., computer-readable medium). Receiver 1106 may be, for example, a radio frequency (RF) receiver. In an aspect, receiver 1106 may receive signals transmitted by at least one base station 105. Additionally, receiver 1106 may process such received signals, and also may obtain measurements of the signals, such as, but not limited to, Ec/Io, SNR, RSRP, RSSI, etc. Transmitter 1108 may include hardware, firmware, and/or software code executable by a processor for transmitting data, the code comprising instructions and being stored in a memory (e.g., computer-readable medium). A suitable example of transmitter 1108 may including, but is not limited to, an RF transmitter.

Moreover, in an aspect, UE 110 may include RF front end 1188, which may operate in communication with one or more antennas 1165 and transceiver 1102 for receiving and transmitting radio transmissions, for example, wireless communications transmitted by at least one base station 105 or wireless transmissions transmitted by UE 110. RF front end 588 may be connected to one or more antennas 1165 and can include one or more low-noise amplifiers (LNAs) 1190, one or more switches 1192, one or more power amplifiers (PAs) 1198, and one or more filters 1196 for transmitting and receiving RF signals.

In an aspect, LNA 1190 can amplify a received signal at a desired output level. In an aspect, each LNA 1190 may have a specified minimum and maximum gain values. In an aspect, RF front end 1188 may use one or more switches 1192 to select a particular LNA 590 and its specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, RF front end 1188 may use one or more switches 1192 to select a particular PA 1198 and its specified gain value based on a desired gain value for a particular application.

Also, for example, one or more filters 1196 can be used by RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, RF front end 1188 can use one or more switches 1192 to select a transmit or receive path using a specified filter 1196, LNA 1190, and/or PA 1198, based on a configuration as specified by transceiver 1102 and/or processor 1112.

As such, transceiver 1102 may be configured to transmit and receive wireless signals through one or more antennas 1165 via RF front end 1188. In an aspect, transceiver may be tuned to operate at specified frequencies such that UE 110 can communicate with, for example, one or more base stations 105 or one or more cells associated with one or more base stations 105. In an aspect, for example, modem 1114 can configure transceiver 1102 to operate at a specified frequency and power level based on the UE configuration of the UE 110 and the communication protocol used by modem 1114.

In an aspect, modem 1114 can be a multiband-multimode modem, which can process digital data and communicate with transceiver 1102 such that the digital data is sent and received using transceiver 1102. In an aspect, modem 1114 can be multiband and be configured to support multiple frequency bands for a specific communications protocol. In an aspect, modem 1114 can be multimode and be configured to support multiple operating networks and communications protocols. In an aspect, modem 1114 can control one or more components of UE 110 (e.g., RF front end 1188, transceiver 1102) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of subframe processing for wireless communications, comprising:
receiving a first component carrier and a second component carrier from a transmitting device during a subframe including a first set of data symbols on the first component carrier and a second set of data symbols on the second component carrier, wherein the first component carrier is a priority component carrier having a different timing characteristic than the second component carrier;
processing, using a hardware processing pipeline, the first set of data symbols interleaved with the second set of data symbols; and
transmitting, within the subframe, an acknowledgment indicating a processing status of at least all of the first set of data symbols.

2. The method of claim 1, wherein the different timing characteristic is a different length of a guard period between a first time and a second time, wherein the first time is a time of receiving a respective last symbol of the subframe on the respective component carrier and the second time is a time of transmitting the acknowledgment.

3. The method of claim 2, wherein the acknowledgment indicates a processing status of the first set of data symbols and the second set of data symbols.

4. The method of claim 1, wherein the different timing characteristic is a different latency target, wherein a latency target for the first component carrier is within the subframe, and a latency target for the second component carrier is a subsequent subframe.

5. The method of claim 4, wherein the first component carrier carries self-contained subframes.

6. The method of claim 4, further comprising transmitting a second acknowledgment based on the processing of at least one symbol of the second set of data symbols during the subsequent subframe.

7. The method of claim 1, wherein the different timing characteristic is a different subframe timing, wherein a subframe timing of the second component carrier is offset from a subframe timing of the first component carrier.

8. The method of claim 7, wherein the subframe timing of the second component carrier is offset from the subframe timing of the first component carrier by less than a symbol period.

9. The method of claim 7, further comprising transmitting a second acknowledgment based on the processing of at least all of the second set of data symbols within the subframe according to the subframe timing of the second component carrier.

10. The method of claim 1, wherein the processing the first set of symbols interleaved with the second set of symbols comprises:
- interleaving the first set of data symbols and the second set of data symbols to produce an interleaved set of symbols; and
- sequentially processing the interleaved set of symbols using a plurality of sequential hardware processing components.

11. An apparatus for subframe processing in wireless communications, comprising:
- a memory;
- a receiver; and
- a processor coupled to the memory and the receiver, wherein the memory includes instructions executable by the processor to:
  - receive, via the receiver, a first component carrier and a second component carrier from a transmitting device during a subframe including a first set of data symbols on the first component carrier and a second set of data symbols on the second component carrier, wherein the first component carrier is a priority component carrier having a different timing characteristic than the second component carrier;
  - process, by a processing pipeline of the processor, the first set of data symbols interleaved with the second set of data symbols; and
  - transmit, within the subframe, an acknowledgment indicating a processing status of at least all of the first set of symbols.

12. The apparatus of claim 11, wherein the different timing characteristic is a different length of a guard period between a first time and a second time, wherein the first time is a time of receiving a respective last symbol of the subframe on the respective component carrier and the second time is a time of transmitting the acknowledgment.

13. The apparatus of claim 12, wherein the acknowledgment indicates a processing status of the first set of data symbols and the second set of data symbols.

14. The apparatus of claim 11, wherein the different timing characteristic is a different latency target, wherein a latency target for the first component carrier is within the subframe, and a latency target for the second component carrier is a subsequent subframe.

15. The apparatus of claim 14, wherein the first component carrier carries self-contained subframes.

16. The apparatus of claim 14, wherein the processor is configured to transmit, during the subsequent subframe, a second acknowledgment based on the processing of at least one symbol of the second set of data symbols.

17. The apparatus of claim 11, wherein the different timing characteristic is a different subframe timing, wherein a subframe timing of the second component carrier is offset from a subframe timing of the first component carrier.

18. The apparatus of claim 17, wherein the subframe timing of the second component carrier is offset from the subframe timing of the first component carrier by less than a symbol period.

19. The apparatus of claim 18, wherein the processor is configured to transmit a second acknowledgment based on the processing of at least all of the second set of data symbols within the subframe according to the subframe timing of the second component carrier.

20. The apparatus of claim 11, wherein the processing pipeline includes a plurality of sequential hardware processing components and is configured to interleave the first set of data symbols and the second set of data symbols to produce an interleaved set of symbols and sequentially process the interleaved set of symbols using the plurality of sequential hardware processing components.

21. An apparatus for pipeline processing in wireless communications, comprising:
- means for receiving a first component carrier and a second component carrier from a transmitting device during a subframe including a first set of data symbols on the first component carrier and a second set of data symbols on the second component carrier, wherein the first component carrier is a priority component carrier having a different timing characteristic than the second component carrier;
- means for processing, using a hardware processing pipeline, the first set of data symbols interleaved with the second set of data symbols; and
- means for transmitting, within the subframe, an acknowledgment indicating a processing status of at least all of the first set of data symbols.

22. The apparatus of claim 21, wherein the different timing characteristic is a different length of a guard period between a first time and a second time, wherein the first time is a time of receiving a respective last symbol of the subframe on the respective component carrier and the second time is a time of transmitting the acknowledgment.

23. The apparatus of claim 22, wherein the acknowledgment indicates a processing status of the first set of data symbols and the second set of data symbols.

24. The apparatus of claim 21, wherein the different timing characteristic is a different latency target, wherein a latency target for the first component carrier is within the subframe, and a latency target for the second component carrier is a subsequent subframe.

25. The apparatus of claim 24, wherein the means for transmitting is configured to transmit, during the subsequent subframe, a second acknowledgment based on the processing of at least one symbol of the second set of data symbols.

26. The apparatus of claim 21, wherein the different timing characteristic is a different subframe timing, wherein a subframe timing of the second component carrier is offset from a subframe timing of the first component carrier.

27. The apparatus of claim 26, wherein the subframe timing of the second component carrier is offset from the subframe timing of the first component carrier by less than a symbol period.

28. The apparatus of claim 26, wherein the means for transmitting is configured to transmit a second acknowledgment based on the processing of at least all of the second set of data symbols within the subframe according to the subframe timing of the second component carrier.

29. The apparatus of claim 26, wherein the means for processing includes a plurality of sequential hardware processing components and the means for processing is configured to interleave the first set of data symbols and the second set of data symbols to produce an interleaved set of symbols and sequentially process the interleaved set of symbols using the plurality of sequential hardware processing components.

30. A non-transitory computer readable medium storing computer executable code for wireless communications comprising code for:
- receiving a first component carrier and a second component carrier from a transmitting device during a subframe including a first set of data symbols on the first component carrier and a second set of data symbols on the second component carrier, wherein the first component carrier is a priority component carrier having a different timing characteristic than the second component carrier;

processing, using a hardware processing pipeline, the first set of symbols interleaved with the second set of symbols; and transmitting, within the subframe, an acknowledgment indicating a processing status at least all of the first set of data symbols.

* * * * *